Patented Oct. 8, 1940

2,217,513

UNITED STATES PATENT OFFICE 2,217,513

CASEIN COMPONENT OF WATER PAINTS

William H. Fales and William F. Fales, North Hempstead, N. Y.

No Drawing. Application July 19, 1938,
Serial No. 220,126

2 Claims. (Cl. 134—46)

This invention relates to water paints having a casein base, and relates more particularly to an improved and stable casein solution to be used as an essential component of such paints.

It is the general object of our invention to provide an improved casein solution as a component of water paint, characterized by increased stability, satisfactory and enduring viscosity, excellent keeping qualities, reduced casein content and exceptional inherent suspensive qualifications.

Our improved casein solution may be economically produced, is free flowing under the brush, has excellent adhesiveness, flexibility and elasticity, and sets at a desirable speed.

Our invention further relates to certain combinations of materials and to certain ordered procedure which will be hereinafter set forth and more particularly pointed out in the appended claims.

In the preferred manner of practicing our invention, we first prepare a known casein solution by adding water to commercial casein, commonly in the ratio of 5 or 6 to 1, together with a suitable alkali, such as sodium carbonate, borax or ammonia. This mixture is heated and agitated until the casein is completely dissolved or dispersed, after which any suitable preservative may be introduced.

Having prepared this known casein solution, we then add an aqueous solution of alkaline or neutral salts or esters of palmitin or palmitic acid to the casein solution in the preferred ratio of one part by weight of salts or esters to from three to eight parts of dry casein, depending upon the particular qualities desired in the finished paint. In general, we have found that one part of salts or esters to four parts of casein will give excellent satisfaction under usual conditions.

This aqueous solution is preferably in such form that the glycerols or tri-atomic alcohols therein have been liberated but not discarded. A very satisfactory aqueous solution for the purposes herein defined may be produced by forming an alkaline or neutral salt or soap of the vegetable product sold under the commercial name of Japan wax.

By adding such an aqueous and soapy solution to the ordinary casein solution and in the proportions indicated, we produce a casein solution for use in water paints which has much improved and highly satisfactory qualities. In particular, we get excellent suspension without the addition of clay or other suspensive agents. We also get the desired viscosity in the paint with a reduced proportion of casein, and we maintain this viscosity over a long period of time. As we are able to reduce the proportion of casein, we secure increased flexibility and elasticity, with less liability of cracking, peeling or crazing.

Our improved casein solution as above described has been found very satisfactory as a component in water paints to be used for all ordinary purposes. If exceptional resistance to heavy washing and cleaning is desired, however, such resistance may be attained by adding to the described solution from two to ten per cent by volume of a suitable vegetable or fish oil.

Having thus described our invention and the advantages thereof, we do not wish to be limited to the details herein disclosed, otherwise than as set forth in the claims, but what we claim is:

1. A casein component of water paints comprising the product which results from completely dissolving and dispersing a mixture of casein and a soluble alkali in water, and thereafter combining said product with an aqueous solution of a soap having a vegetable wax as its combining fatty acid, the casein component being characterized by satisfactory viscosity, increased flexibility and enduring stability, a reduced casein content, and avoidance of the necessity of additional suspensive agents, the proportion of wax to casein by weight in said casein component being not substantially less than 1 to 8 and not substantially more than 1 to 3.

2. A casein component as set forth in claim 1 in which the combining fatty acid is Japan wax and the aqueous solution contains liberated glycerols.

WILLIAM H. FALES.
WILLIAM F. FALES.